Jan. 6, 1948.  J. C. OSBORN  2,434,008
MANUFACTURE OF CAPILLARY TUBING
Filed June 11, 1945
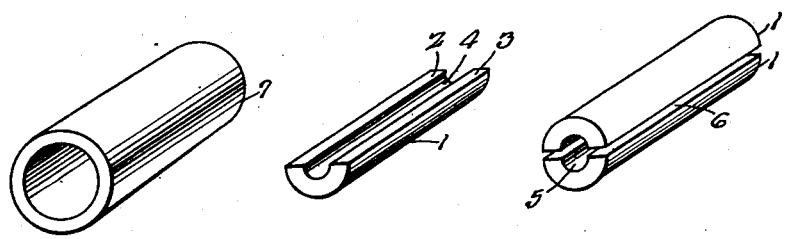
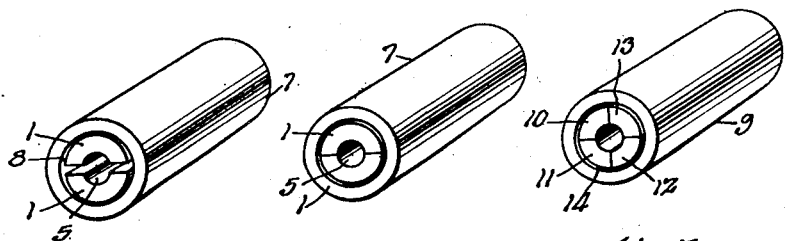
Fig. 6
INVENTOR
Jesse C. Osborn
BY
ATTORNEY Patented Jan. 6, 1948

2,434,008

UNITED STATES PATENT OFFICE 2,434,008

MANUFACTURE OF CAPILLARY TUBING

Jesse C. Osborn, Carlyle, Ill.

Application June 11, 1945, Serial No. 598,883

2 Claims. (Cl. 138—47)

This invention relates to the manufacture and production of fabricated capillary tubing having a smooth uniform bore, the axis of which is concentric with the outer wall structure.

The object of this invention is to produce a fabricated capillary tube having a uniform diameter and a smooth bore regardless of the outer diameter of the tube structure.

In the drawings:

Figure 1 shows a perspective view of a semi-circular segmental wire element;

Figure 2 shows a perspective view of two superposed semi-cylindrical segments;

Figure 3 shows a perspective view of the outer portion of the capillary tube;

Figure 4 shows a perspective view of the assembled sections of the tube;

Figure 5 shows a perspective view of the tube of Figure 4 following the metal working operation;

Figure 6 shows the fabricated tube after reduction; and

Figure 7 shows a perspective view of a fabricated tube having a plurality of segmental inserts.

According to prior art constructions, capillary tubing is made in a variety of ways, some of which involve a core section in which a suitable aperture is provided with the core welded to the sheathing and the entire assembly forged in such a manner as to reduce the passageway or aperture in the tubing to the desired cross-sectional area. Under this method of manufacture there is lack of uniformity in fluid capacity of different sections of the tube under equal increase in temperature with the result that the action of the capillary tubing, when installed in a gas stove, refrigerator, or similar device, is irregular and erratic. The instant invention seeks to overcome bore or aperture irregularities and make the bore uniform in size and shape throughout its entire length.

The objects and advantages set forth above are achieved in the tube and its method of manufacture illustrated in the accompanying drawings in which numeral 1 refers to a semi-cylindrical section of metal. The flat top faces 2 and 3, as well as the semi-cylindrical groove 4, are preferably machined surfaces in order that they may properly fit and align with cooperating surfaces and grooves in a companion structure superposed thereupon as illustrated in Figure 2. The machining of groove 4 enables it to have a much more uniform cross-sectional area as well as a smoother surface when subsequently worked and will maintain said smooth surface to produce a circular bore 5 as shown in the subsequent view.

The semi-cylindrical sections 1, 1, upon being superposed, have a dividing line or space 6 as illustrated in Figure 2. The semi-cylindrical sections 1, 1 are then inserted in the bore of a piece of suitable tubing 7 illustrated in Figure 3. Tube 7 is preferably of a metal dissimilar from sections 1, 1. It will be noted that when sections 1, 1 are inserted in tubing 7, they are freely slidable therein leaving a space 8 between the exterior of the semi-cylindrical sections 1, 1 and the interior surface of tubing 7. When the parts are assembled as shown in Figure 4, tube 7 is subjected to a metal working operation which is preferably a forging operation but may be a rolling or a metal drawing operation. The forging of tube 7 and the semi-cylindrical inserts 1, 1 is preferably done in a rotary die, well-known to the art, wherein tube 7 is forged to a reduced diameter to eliminate space 8, as particularly shown in Figure 5, and to firmly clamp the faces 2 and 3 on each of the semi-cylindrical inserts into engagement and eliminating the space 6 as shown in Figure 2.

When worked by the action of a forging die, the die will reduce the diameter of tube 7 initially into contact with inserts 1, 1 and continued working will reduce the diameter of bore 5. The working is continued a sufficient length of time to reduce bore 5 to a desired diameter which may be as small as fifteen-thousandths of an inch. Being originally a machined surface, the surface of the semi-circular groove is also characterized as a machined surface. It, therefore, follows that the interior surface of bore 5 will consequently be characteried as a machined bore following the metal working operation to the desired ultimate diameter. The metal working action of the rotary die or other reducing tool on the fabricated tubing will subject each part thereof, as it is passed through the die or tool, to the identical action, thereby causing the size of the bore to be uniform. Furthermore, bore 5 will always be concentric with the sheath or tube 7, thus aiding in insuring the uniformity of bore diameter. The metal working operation will not fuse or freeze the sheath or tube 7 to the semi-cylindrical segmental elements 1, 1 because the processing is done as a cold metal working operation and also because tube 7 and the inserts are of dissimilar metals.

Figure 6 is intended to represent the relative proportion of the parts of the fabricated tube following the metal working operation.

Figure 7 illustrates a tube 9 having a plurality of inserts 10, 11, 12, and 13, each of which is machined in a manner similar to insert 1, and the same metal working operation described in connection with the tube illustrated in Figure 5 is performed thereon. The resulting bore 14 in the capillary tube is uniform in size throughout its entire length. Tube 9 is first reduced in diameter to snugly fit the inserts. Bore 14 is capable of further reduction from its original diameter in micrometric dimensions by the application of a metal working reducing operation as described above. While held firmly within the sheath or tube 9, the several segments 10 through 13 are not fused or frozen thereto for the same reason as set forth above in connection with tube 7 and inserts 1, 1. The number of segments may be varied according to the wishes of the individual operator, it being only essential that the contacting surfaces of the segmental sections result in a fit so close and tight that leakage of pressure fluid is prevented along the abutting faces of the segments under normal conditions. The bore of tube 14 remains cencentric and uniform with that of sheath 9 under similar forging conditions.

The reason for making tubes 7 and 9 and the respective inserts 1, 1 and 10, 11, 12, and 13 of dissimilar metals is to provide for separation between the core and the sheath to permit compensation of fluid in the bore or passageway 5. Should the core and sheath fuse or freeze together, the compensating action necessary when the tube is installed in thermostatic controls would be erratic, thereby causing erratic operation of the equipment in which it is installed.

Having fully described my invention, that which I claim as novel and desire to protect by Letters Patent of the United States is:

1. In a compensated capillary element for use under varying ambient temperature conditions, a tubular metal sheath and a multi-part core of metal therein, said core parts' having a lower coefficient of expansion than the material of the sheath, said core having a longitudinally extending fluid passageway therethrough and said core parts being separable from each other and from said sheath to provide spaces into which fluid in said passageway may expand under increase of temperature of a part of the element and of the fluid therein.

2. In a compensated capillary element for use under varying ambient temperature conditions, a tubular metal sheath and a metal core therein composed of a plurality of segments of a cylinder, said core parts having a lower coefficient of expansion than the material of the sheath, said core having a central longitudinally extending fluid passageway therethrough whose wall includes the inner meeting lines between the surfaces of adjacent segments and said core parts being separable from each other and from said sheath to provide spaces into which fluid in said passageway may expand under increase of temperature of a part of the element and of the fluid therein.

JESSE C. OSBORN.

REFERENCES CITED

The following references are of record in the file of this patent:

UNITED STATES PATENTS

| Number | Name | Date |
| --- | --- | --- |
| 432,690 | Burdon | July 22, 1890 |
| 776,859 | Low | Dec. 6, 1904 |

FOREIGN PATENTS

| Number | Country | Date |
| --- | --- | --- |
| 24,395 | Great Britain | 1894 |